United States Patent
Mosek et al.

(10) Patent No.: US 7,788,415 B2
(45) Date of Patent: Aug. 31, 2010

(54) MANAGEMENT OF INTERNAL OPERATIONS BY A STORAGE DEVICE

(75) Inventors: Amir Mosek, Tel Aviv (IL); Elad Baram, Shilat Village (IL)

(73) Assignee: Sandisk IL Ltd., Kfar Saba (IL)

( * ) Notice: Subject to any disclaimer, the term of this patent is extended or adjusted under 35 U.S.C. 154(b) by 277 days.

(21) Appl. No.: 12/127,229

(22) Filed: May 27, 2008

(65) Prior Publication Data
US 2008/0301341 A1   Dec. 4, 2008

Related U.S. Application Data

(60) Provisional application No. 60/940,426, filed on May 28, 2007.

(51) Int. Cl.
   G06F 3/00 (2006.01)
   G06F 13/14 (2006.01)
   G06F 13/16 (2006.01)
(52) U.S. Cl. ............... 710/5; 710/6; 711/154; 711/103
(58) Field of Classification Search ........ 710/5, 710/6
   See application file for complete search history.

(56) References Cited

U.S. PATENT DOCUMENTS

| | | | |
|---|---|---|---|
| 2003/0046497 A1* | 3/2003 | Dandrea | 711/154 |
| 2003/0123176 A1 | 7/2003 | Arakawa et al. | |
| 2003/0204692 A1 | 10/2003 | Tamer et al. | |
| 2006/0161728 A1 | 7/2006 | Bennett et al. | |
| 2007/0300008 A1* | 12/2007 | Rogers et al. | 711/103 |
| 2008/0181000 A1* | 7/2008 | Lasser | 365/185.03 |
| 2009/0271563 A1* | 10/2009 | Gopalan et al. | 711/103 |

OTHER PUBLICATIONS

Extended European Search Report for EP Application No. 08251850.7 dated Feb. 25, 2009, 9 pages.

* cited by examiner

Primary Examiner—Henry W Tsai
Assistant Examiner—Hyun Nam
(74) Attorney, Agent, or Firm—Toler Law Group

(57) ABSTRACT

A method enables a storage device to autonomously (i.e., without intervention of a host device) determines whether an integral sequence of commands, which is related to one or more storage commands issued by the host device, is in a certain state (i.e., it is "active" or "inactive") or is transitioning from "active" state to "inactive" state, or from "inactive" state to "active" state. Depending on the determined state or transition, the storage device determines whether to refrain from executing Extra-Sequence ("ESQ") operations and permit executing Intra-Sequence ("ISQ") operations, or vice versa.

19 Claims, 9 Drawing Sheets

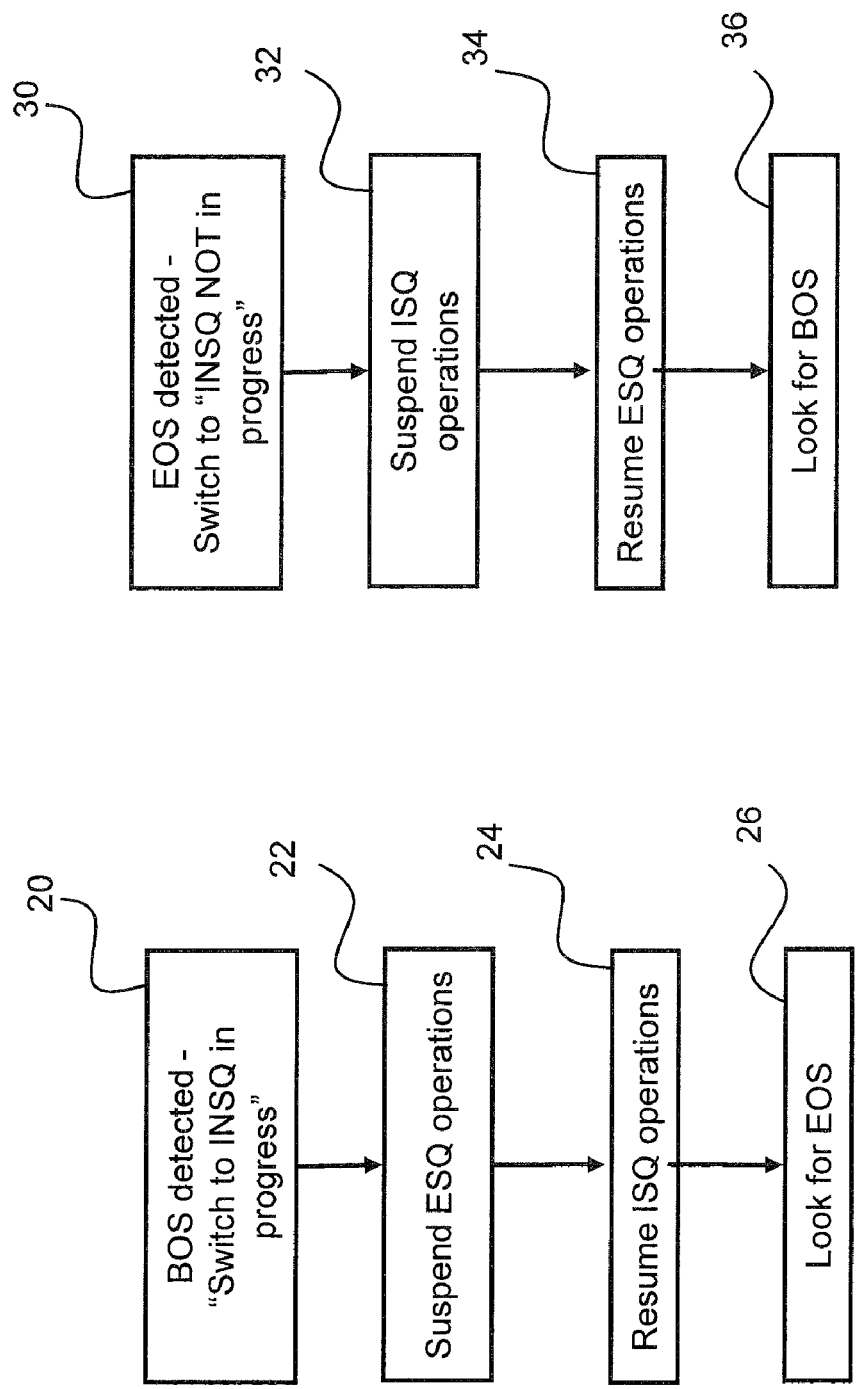

| INSQ No. | INSQ's Identifier | INSQ's BOS parameter | INSQ's BOS Threshold | INSQ's EOS parameter | INSQ's EOS Threshold |
|---|---|---|---|---|---|
| 1 | Play MP3 | Regular average read rate that matches MP3 standard (16 KB/s) | At least 2 seconds of regular data reading | Average read rate that does not match MP3 standard (16 KB/s) | Not streaming at least 1 second |
| 2 | Capture Multishot Image | Frequency of bursts writing at or over 8 MB/s | 3 bursts separated at less than 1 millisecond. | Frequency of bursts writing at over 8 MB/s | Delay of over 3 milliseconds between bursts |
| 3 | Update Boot Image | Writing to sector #0 (Boot image header) | Occurrence of the event | Writing to last sector of the Boot image | Occurrence of the event |
| 4 | Read Boot Image | Reading from sector #0 (Boot image header) | Occurrence of the event | Reading the last sector of the Boot image | Occurrence of the event |

Fig. 4

MANAGEMENT OF INTERNAL OPERATIONS BY A STORAGE DEVICE

REFERENCE TO EARLIER-FILED APPLICATIONS

This application claims the benefit of U.S. Provisional Patent Application No. 60/940,426, filed May 28, 2007, the content of which is incorporated by reference herein in its entirety.

FIELD OF THE INVENTION

The present invention generally relates to storage devices and more specifically to a method for allowing autonomous management of internal operations by a storage device, and to a storage device using the method.

BACKGROUND

By "integral sequence of commands" ("INSQs") is meant herein a recurrent sequence of commands sent to a storage device from a host device, such as an MP3 player, a digital camera, or a computer system (e.g., a laptop), which sequence or storage device is associated with certain applications, for example with music playing, video recording, images capturing, etc., that have associated with them features, metadata or attributes such as packet size, timestamp, audio or video play back duration, data-read or data-write rate, address access or address continuity, etc. A host device sometimes sends an INSQ to a storage device with which it works regardless of which internal operation is currently executed by, or is in progress in, the storage device. This may detrimentally affect the performance of the storage device and the performance of the storage-host system as a whole.

The execution of some of the storage device's operations are to be avoided while an INSQ is executed (i.e., while the INSQ is "active", "On", or "in progress"), whereas some other storage device's operations may be beneficial or mandatory during the execution of the INSQ, as explained below. A sequence of commands that is not an INSQ is referred to herein as "sporadic sequence of commands". That is, by "sporadic sequence of commands" is meant commands that are not considered by the storage device as part of a sequence of commands "known" to the storage device, unlike INSQs that are known to the storage device by being defined.

A storage device in a computer system can be regarded as rendering a storage service and, therefore, the storage device is expected to provide a good quality of service ("QoS") even if it performs background tasks and executes internal operations such as "housekeeping" operations that are required for the storage device's normal operation.

Depending on the context of service given by a computer system (e.g., playing back an audio file, capturing images, copying data file, etc.) an operation executable by the storage device as a "background" operation can belong to a first set of internal operations, which is referred to hereinafter as an Extra-sequence ("ESQ") operations group, or to a second set of internal operations, which is referred to hereinafter as an Intra-Sequence ("ISQ") operations group.

By "ESQ operation" is meant herein a storage operation (e.g., static wear leveling) that should be avoided if an INSQ is in progress because the ESQ operation would have a detrimental effect on, or it would interfere with, or it would otherwise degrade, the performance of the storage device. For example, it would be beneficial not to execute static wear leveling operations while a music file is being played back from the storage device.

By "ISQ operation" is meant herein a storage, or storage-related, operation that is allowed or permitted to be executed during the execution of an INSQ because it has a positive contribution on the storage device's overall operation, or at least it does not interfere with or otherwise negatively affect the execution of the INSQ. In some cases, such an ISQ operation would, if executed, significantly improve internal efficiency of the storage device itself or the efficiency of the involved storage system as a whole. Operations made in preparation for the next, or for an expected, command (e.g., caching the next data) are exemplary ISQ operations. Sometimes, ISQ operations are even desired because, as far as the Quality of Service ("QoS") and the overall storage device's efficiency are concerned, they have a positive contribution.

In respect of storage devices, ESQ operations may include operations such as archiving cached data, static wear leveling, flash folding (also known in the field of flash memory devices as "garbage collection"), ruggedization, and so on, which are known operations in the art of digital data storage management. ISQ operations may include: flash management operations; encryption/decryption of outgoing/incoming data; compression/decompression of outgoing/incoming data; anti-virus operation; defragmentation operation; ruggedization; backing up data; changing data format and so on, which are known operations in the art of digital data storage management. Thus, notably, whether a given operation is an ISQ or ESQ may depend on the operation (e.g., INSQ) in progress. The same operation may be an ISQ while one INSQ is occurring and an ESQ while another INSQ is occurring.

In order to improve the performance of storage devices (e.g., in terms of performance, power failure immunity, stable bit rate, etc.), execution of ESQ operations has to be coordinated with the execution of INSQ in such a way that ESQ operations are not executed while an INSQ is in progress. The reason for this is that executing ESQ operations while an INSQ is in progress can have an adverse impact on the storage device's performance, which may, for example, result in high latency, loss of data, or data corruption. ESQ operations have traditionally been initiated by host devices because of the presumption that only a host device can identify when an INSQ terminates and an ESQ operation can, therefore, safely be commenced.

In one prior art solution ESQ operations are allowed to be commenced by a storage device only after the device's host notifies the storage device that a current INSQ is terminating, or has terminated, and no new INSQ is scheduled for the time being, or for the next couple of seconds, for example. In other words, even though traditional storage devices are capable of initiating ESQ operations, they still need confirmation from their host device that they can do so. This constraint requires cooperation of the storage device's designer with the host device designer to allow the storage device's designer to schedule ESQ operations in such a way that they will not collide with an active host device's INSQ.

In another prior art solution ESQ operations are allowed to be initiated by a storage device autonomously, but they are not synchronized with the host device; i.e., ESQ operations are sometimes executed by the storage device at the wrong timing; i.e., at times when an INSQ is in progress and, therefore, should not be interfered with by ESQs.

It would therefore be beneficial for a storage device to be able to automatically identify, under the changing context of the service rendered by the involved storage system, if and when a storage background operation can be executed as originally planned or scheduled by the storage device, and if, when and which operations should be prevented, suspended or deferred until a currently executed INSQ is terminated, as well as if, when and which operations may or should be performed during INSQs execution.

SUMMARY

The following embodiments and aspects thereof are described and illustrated in conjunction with systems, tools, and methods, which are meant to be exemplary and illustrative but not limiting in scope.

According to the present disclosure a storage device autonomously detects, without intervention of a host device, if and when an INSQ is in a certain state (i.e., in "active" state or in "inactive" state) or is changing its state from "active" to "inactive", or from "inactive" to "active". Depending on the current state of the INSQ, or on the transition thereof, the storage device avoids, suspends or refrains from executing ESQ operations or ISQ operations, or allows or permits these operations.

A method is provided for handling, by a storage device, internal operations of the storage device, the method including: (a) defining one or more INSQs of commands, each of the one or more integral sequences of commands being capable of being in an "active" state and in an "inactive" state; (b) associating with each of the one or more integral sequences of commands a first set of internal operations ("ESQ") and a second set of internal operations ("ISQ"), the first set of internal operations being operations that are not to be executed while the respective integral sequence of commands is in the "active" state, and the second set of internal operations being operations that are permitted to be executed while the respective integral sequence of commands is in the "active" state; (c) receiving a command from a host device; (d) based on information derived from the received command, (and possibly from previously received commands) determining whether one of the one or more integral sequences of commands is in the "active" state, or is transitioning from the "inactive" state to the "active" state; and (e) if the one of the one or more integral sequences of commands is in the "active" state, or is transitioning from the "inactive" state to the "active" state the storage device refrains from executing any operation of the first set of internal operations associated with the respective integral sequence of commands.

If the one of the one or more integral sequences of commands is in the "active" state, or is transitioning from the "inactive" state to the "active" state the storage device may permit execution of any operation of the second set of internal operations associated with the respective integral sequence of commands. If, however, the one of the one or more integral sequences of commands is in the "inactive" state, or is transitioning from the "active" state to the "inactive" state, the storage device permits execution of an operation of the first set of internal operations and refrains from executing any operation of the second set of internal operations associated with the respective integral sequence of commands.

The storage device may determine a transition of the one of the one or more integral sequences of commands from the "inactive" state to the "active" state, and from the "active" state to the "inactive" state, by determining whether the information derived from the command or commands received from the host device satisfy predefined Beginning-Of-Sequence ("BOS") conditions or End-Of-Sequence ("EOS") conditions, respectively. The storage device determines whether the information derived from the command(s) received from the host device satisfy the predefined BOS conditions or the EOS conditions by comparing values, or accumulated values, of dynamic parameters to predefined static parameters.

At least one of the one or more integral sequences of commands may be associated with playing back of multimedia content, or with capturing multimedia content or images, or with data synchronization, or with a boot command.

An operation of the first set, or of the second set, of internal operations may be a flash management operation; an encryption/decryption operation for encrypting/decrypting outgoing/incoming data; a compression/decompression operation for compressing/decompressing outgoing/incoming data; an anti-virus operation; a ruggedization operation; a defragmentation operation; a backing up operation for backing up data; and an operation involving changing data format. A flash management operation may be a garbage collection operation; an error correction operation; caching data operation for caching data into a fast flash storage area of the storage device; a flushing operation for flushing cached data; a low power mode operation; and a static wear leveling operation.

A storage device is also provided, which may be a flash memory device. The storage device may include a communication interface for receiving storage commands from a host device, and a mass storage area for holding (i) one or more predefined integral sequences, each of the one or more integral sequences of commands being capable of being in an "active" state and in an "inactive" state and, associated with each of the one or more integral sequences of commands, (ii) a first set of internal operations ("ESQ") and a second set of internal operations ("ISQ"), the first set of internal operations being operations that are not to be executed while the respective integral sequence of commands is in the "active" state, and the second set of internal operations being operations that are permitted to be executed while the respective integral sequence of commands is in the "active" state.

The storage device also includes a controller that is adapted or configured (i) to received, via said communication interface, a command from the host device and, based on information derived from the received command, (and possibly from previously received commands) (ii) to determine whether one of the one or more integral sequences of commands is in the "active" state, or is transitioning from the "inactive" state to the "active" state, or whether the one of the one or more integral sequences of commands is in the "inactive" state, or is transitioning from the "active" state to the "inactive" state.

Responsive to the one of the one or more integral sequences of commands being in the "active" state, or transitioning from the "inactive" state to the "active" state, the controller refrains from executing any operation of the respective first set of internal operations. In addition to the controller refraining from executing any operation of the respective first set of internal operations the controller may permit execution of any operation of the second set of internal operations associated with the respective integral sequence of commands. If the one of the one or more integral sequences is in the "inactive" state, or it is transitioning from the "active" state to the "inactive" state, the controller permits execution of any operation of the respective first set of internal operations.

The controller may determine a transition, or transitioning, of any of the one or more integral sequences from "inactive" state to "active" state, and from "active" state to "inactive" state, by assessing or determining whether the information derived from the command or commands received from the host device satisfy predefined BOS conditions or EOS conditions, respectively.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which:

FIG. 2 shows steps taken by a storage device when an INSQ transitions from "INSQ not in progress" state to "INSQ in progress" state according to the present disclosure;

FIG. 3 shows steps taken by a storage device when an INSQ transitions from "INSQ in progress" state to "INSQ is not in progress" state according to the present disclosure;

FIG. 4 shows an INSQ table for holding static information according to an example embodiment of the present disclosure;

Figure 1:
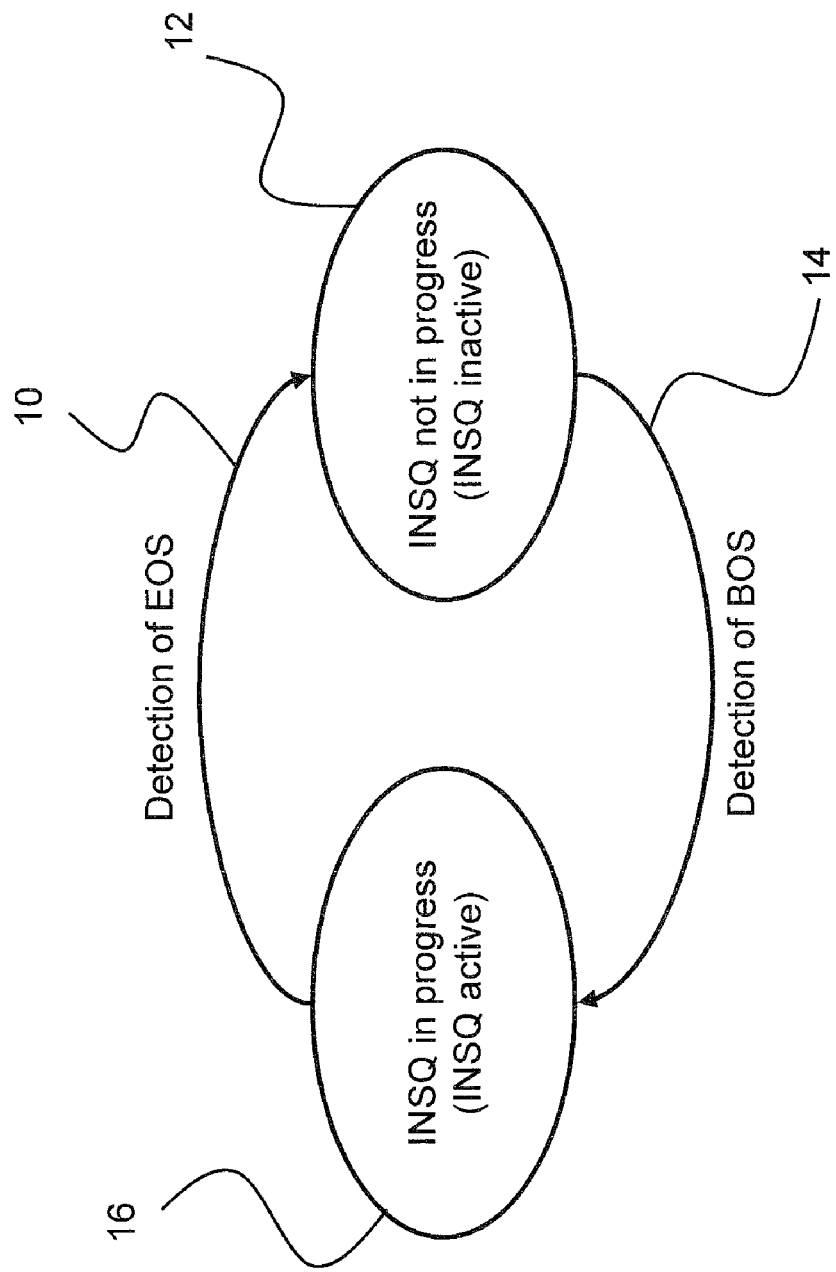
FIG. 1 shows a state machine that is usable by a storage device to decide a status of an INSQ according to an example embodiment of the present disclosure.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The claims below will be better understood by referring to the present detailed description of example embodiments of the invention. This description is not intended to limit the scope of claims but instead to provide examples of the invention.

By "Beginning-of-Sequence" (BOS) is meant herein a conclusion reached, or a decision made, by a storage device that an INSQ is commencing or occurring, or that the INSQ has commenced or has occurred. The storage device reaches the conclusion, or makes the decision based on predefined conditions, without the host device, with which the storage device operates, intervening in the conclusion or decision process, or affecting it in any way. The storage device evaluates commands issued by the host device in view of a predefined set of parameters and threshold values (i.e., the conditions) that, if an INSQ is not in progress, can collectively indicate to the storage device the beginning of the INSQ.

By "End-of-sequence" (EOS) is meant herein a conclusion reached, or a decision made, by a storage device that an INSQ is terminating or has terminated. The storage device reaches the conclusion, or makes the decision based on predefined conditions, without the host device, with which the storage device operates, intervening in the conclusion or decision process, or affecting it in any way. The storage device evaluates commands issued by the host device in view of a predefined set of parameters and threshold values (i.e., the conditions) that, if an INSQ is in progress, can collectively indicate to the storage device the termination of the INSQ.

FIG. 1 is a simplified state machine usable by a storage device in accordance with the present disclosure. According to the present disclosure a set of INSQs is predefined and stored in an INSQ table, where each entry in the INSQ table includes an INSQ and parameters that are associated with that INSQ. Regarding the state machine, each INSQ in the INSQ table is capable of being in an "active" state, shown as "Integral-sequence in progress" 16, or in an "inactive" state, shown as "Integral-sequence not in progress" 12. One or more INSQs in the INSQ table can simultaneously be active while the other INSQs are inactive. Regarding FIGS. 2 and 3, multiple instances can occur simultaneously for different INSQs.

Given an INSQ in the INSQ table, if the INSQ is currently in the "Integral-sequence not in progress" 12 state and the storage device identifies a Beginning-of-Sequence (BOS) that, as explained above, indicates that the INSQ is now in the active state or it is transitioning from the inactive state to the active state, then the storage device automatically switches 14 the INSQ's state from "Integral-sequence not in progress" 12 to "Integral-sequence in progress" 16. If the INSQ is currently in the "Integral-sequence in progress" 16 state and the storage device identifies an End-of-Sequence (EOS) that, as explained above, indicates that the INSQ now in the inactive state or it is transitioning from the active state to the inactive state, the storage device automatically switches 10 the integral-sequence's state from "Integral-sequence in progress" 16 to "Integral-sequence not in progress" 12.

FIG. 2 shows steps taken by a storage device when the state of an INSQ changes from "INSQ not in progress" state into "INSQ in progress" state according to the present disclosure. In a storage system that can simultaneously execute more than one task (such storage system is often called "multi-tasking" or "multi-threading" system), more than one INSQ may be in progress and each INSQ in the INSQ table may undergo the same or similar evaluation process for evaluating whether the INSQ is in progress or not.

The following description refers to an exemplary INSQ in the INSQ table (referred to hereinafter as "INSQ 1"), but the same process is relevant to whatever FNSQ may be held in the INSQ table. If "INSQ 1" becomes active the storage device changes, at step 20, the state of the state machine related to "INSQ 1" from "INSQ 1 not in progress" to "INSQ 1 is in progress". The storage device determines that "INSQ 1" becomes active if a BOS is occurring for that INSQ, and BOS is determined as occurring if predefined criteria are satisfied.

Figure 5:
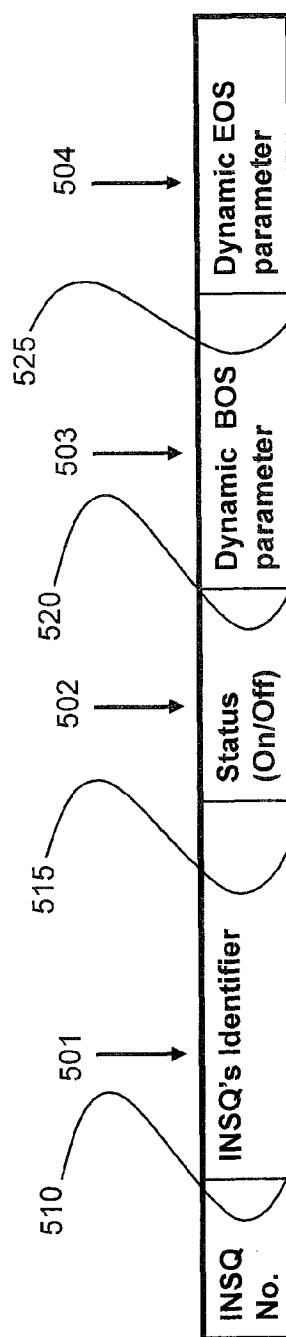
FIG. 5 shows an INSQ table for holding dynamic information according to an example embodiment of the present disclosure.

As explained above, a background operation executed by a storage device can be regarded as an ISQ operation or as an ESQ operation, and ESQ operations should be avoided or stopped while an INSQ is in progress. Therefore at step 22 the storage device suspends ESQ operations pertaining to the active "INSQ 1", resumes, at step 24, ISQ operations that are related to the active INSQ 1, and looks for or waits, at step 26, until "INSQ 1" becomes inactive. The storage device determines that "INSQ 1" becomes inactive if an EOS is occurring for that INSQ, and EOS is determined as occurring if predefined criteria are satisfied. Exemplary INSQ tables and criteria for determining when or if an INSQ is changing, or has changed, its status, are shown in FIGS. 4 and 5, which are described below.

FIG. 3 shows steps taken by a storage device when the state of an INSQ changes from "INSQ in progress" state to "INSQ not in progress" state according to the present disclosure. The following description also refers to the exemplary "INSQ 1" mentioned above, in connection with FIG. 2, but the same evaluation process is relevant to whatever INSQ may be held in the INSQ table. If "INSQ 1" becomes inactive, an EOS is occurring, to which the storage device responds by changing, at step 30, the state of the state machine associated with "INSQ 1" from "INSQ 1 in progress" to "INSQ 1 is not in progress". As explained above, ESQ operations are allowed by the storage device only if the related INSQ is not in progress. Therefore, at step 32 the storage device suspends ISQ operations that are related to the inactive "INSQ 1" and at step 34 the storage device resumes ESQ operations. At step 36 the storage device looks for, or waits until, a BOS can be determined.

An INSQ table holds determination criteria that may include two types of parameters by which a storage device evaluates the status of an INSQ: static parameters, the value of which are not changed during runtime, and dynamic parameters, the value of which are dynamically updated by the storage device during runtime (i.e., "on-the-fly") responsive to one or more commands that the storage device receives or has received from the host device, for example responsive to receiving the last command from the host device, and possibly responsive also to one or more commands that the storage device previously received from the host device. A "static parameter" is effectively a criterion (e.g. threshold) which the storage device uses to determine if an INSQ "on" or "off", or has changed between these two states. A "dynamic parameter" is effectively a value at a given point in time (e.g., upon receipt of a given command by the storage device) of a variable pertinent to an INSQ which the storage device checks against the static parameter to determine if the criterion represented by the static parameter has been satisfied. For example, if the host device is an MP3 player, the set of commands it sends to the storage device may be associated with playing a music file. A set of commands that are sent by the host device to the storage device may include one or more commands. Exemplary INSQs and related static parameters are shown in FIG. 4 and exemplary dynamic parameters related to the INSQs of FIG. 4 are shown in FIG. 5, both of which figures are described below.

FIG. 4 shows an INSQ table 40 according to an example embodiment of the present disclosure. INSQ table 40, which contains INSQs' static parameters, includes four exemplary entries, numbered 1 through 4, each of which accommodates one INSQ and INSQ-related parameters and thresholds, as described below. A storage device identifies and updates the state of an INSQ (i.e., from "INSQ is in progress" state to "INSQ is not in progress" state, and vice versa) based on information held in INSQ table 40.

INSQ table 40 includes five exemplary fields for holding the following exemplary static parameters:

(1) "INSQ's identifier" (shown at 41). This field may accommodate the type of each INSQ or the name that has been assigned to it.

(2) "INSQ's BOS parameter" (shown at 42). This field specifies one or more parameters that have been chosen such that the storage device can calculate or estimate their value or state, and the calculated or estimated values or states can indicate that the related INSQ is already in progress (i.e., it is already active), or that it is transitioning from the inactive state to the active state. The one or more parameters, whose values are derived from one or more commands that the storage device receives from the host device, allow the storage device to decide, or to determine, whether a BOS indication has occurred or is occurring. "Read-performance", "Time Of Arrival" (TOA) and command operands (e.g., logical address accessed by the host device) are exemplary information that the storage device can collect or calculate from commands received from the host device.

A Beginning-of-Sequence (BOS) is considered to have occurred when one or more estimated or calculated parameters meet or exceed a predefined value or satisfy a predefined condition, as is explained in more detail below in connection with the "INSQ's BOS Threshold" field.

(3) "INSQ's BOS threshold" (shown at 43). This field accommodates a logical condition or a set of logical conditions that the storage device applies to the one or more parameters that are specified in INSQ's BOS parameter field 42. If the logical condition, or the set of logical conditions, associated with a particular INSQ are satisfied, the storage device determines that an Integral-sequence BOS has occurred for that INSQ, after which the storage device changes the status of that INSQ to "INSQ in progress". A logical condition may pertain to a minimum value of a BOS parameter, to a maximum value of a BOS parameter, to any value between the minimum and maximum values of a BOS parameter, or to the number of counted events, and so on.

(4) "INSQ's EOS parameter" (shown at 44). This field specifies one or more parameters that have been chosen such that the storage device can calculate or estimate their value or state, and the calculated or estimated values or states can indicate to the storage device that the related INSQ is about to terminate, or that it has just terminated. The one or more parameters, which are derived from commands the storage device receives from the host device, allow the storage device to decide or to determine whether an EOS has occurred or is occurring.

"Read-performance", "Time Of Arrival" (TOA), and command operands (e.g., logical address accessed by the host device) are exemplary information that the storage device can collect or calculate from commands received at the storage device from the host device.

A End-of-Sequence (EOS) is considered to be occurring or to have occurred when one or more estimated or calculated parameters meet or exceed a predefined value or satisfy a predefined condition, as is explained in more detail below in connection with the "INSQ's EOS Threshold" field.

(5) "INSQ's EOS threshold" (shown at 45). This field accommodates a logical condition or a set of logical conditions that the storage device applies to the one or more parameters that are specified in INSQ's EOS parameter field 44. If the logical condition or the set of logical conditions associated with a particular INSQ are satisfied, the storage device determines that an Integral-sequence EOS has occurred for that INSQ, after which the storage device changes the status of that INSQ to "INSQ not in progress". A logical condition may pertain to a minimum value of an EOS parameter, to a maximum value of a EOS parameter, to any value between the minimum and maximum values of a EOS parameter, to the number of counted events, and so on.

By way of example INSQ table 40 holds four exemplary Integral-sequences (INSQs) that are referred to in "Example 1" through "Example 4", which are described below.

EXAMPLE 1

The Host Device is an MP3 Player

The first entry contains an exemplary INSQ called "Play MP3", which pertains to MP3 operations (i.e., the host device is assumed to be an MP3 music player).

An MP3 music player reads media content, which is compressed according to the MP3 data format, from a storage device and utilizes a decompression means (whether a software application or a hardware module) to convert (i.e., by decompressing) the compressed media content into raw data format that can be used (i.e., played back) by it. The MP3 player sends the raw data (i.e., the decompressed media content) to the speaker (i.e., the MP3 player "plays back" the media content). Because the MP3 data format requires that the MP3 file be played back at a rate that is specified by the MP3 standard, which is currently 16 kilobytes per second (KB/sec), the MP3 player requests data from the storage device at the same data rate.

In this example the INSQ's BOS parameter is "Regular average read rate that matches MP3 standard (16 KB/s)", shown at 410, which means that the storage device monitors data-read requests that it receives from the MP3 player, and calculates the average rate at which the MP3 player reads the data to see whether the data-read requests are received at the specified rate (i.e., 16 KB/s). Under normal data play back operation the storage device expects that rate to be 16 KB/s, and as long as no data is read at that rate the storage device "knows" that the Play MP3 INSQ has not started yet. As explained above, it is not advisable to perform some internal operations in a storage device while the MP3 player is playing back media content. For example, performing wear leveling will severely degrade the quality of the played back audio if it is done during playback.

In the above-mentioned example the INSQ's BOS decision threshold for the "Regular average read rate that matches MP3 standard (16 KB/s)" parameter may be, for example, "At least 2 seconds of regular data reading", shown at 415. This means that if data requests are received at the storage device at the above-mentioned rate (i.e., 16 KB/s) and if that rate is maintained for at least 2 seconds, then the storage device assumes that a BOS is occurring or has occurred; i.e., this indicates to the storage device that the "Play MP3" INSQ is commencing or has commenced, or that the "Play MP3" INSQ is in progress. In such a case (i.e., the "Play MP3" INSQ is in progress), the storage device may execute ISQ operations but avoid executing ESQ operations that were predefined for the "Play MP3" INSQ.

In the above-mentioned example the INSQ's EOS parameter is "Average read rate that does not match MP3 standard (16 KB/s)", shown at 420, which means that the storage device can calculate the average rate at which data read requests are received from an MP3 player, to see whether it is the specified rate (i.e., 16 KB/s). Under normal data play back operation the storage device expects that rate to be 16 KB/s, and as long as data requests continue to be received at the storage device at that rate the storage device "knows" that the "Play MP3" INSQ is still in progress.

In the above-mentioned example the INSQ's EOS decision threshold value for the "Average read rate that does not match MP3 standard (16 KB/s)" parameter may be, for example, "Not streaming at least 1 second", shown at 425. This means that if data requests cease to be received at the storage device at the above-mentioned rate (i.e., 16 KB/s) for at least one second, this indicates to the storage device that an EOS is occurring or has occurred; i.e., this indicates to the storage device that the "Play MP3" INSQ is terminating or has terminated, or that the "Play MP3" INSQ is no longer in progress. The average read rate will deviate from the MP3 standard during pauses in playing an MP3 song or data, or after the entire MP3 file has been played back. In such a case (i.e., the "Play MP3" INSQ is not in progress), the storage device allows executing ESQ operations that were predefined for the "Play MP3" INSQ, or resuming execution thereof.

EXAMPLE 2

The Host Device is a Digital Camera

The second entry contains an exemplary INSQ called "Capture Multi-Shot Image", which pertains to digital camera operations (i.e., the host device is assumed to be a digital camera). For the sake of the example it is assumed that a digital camera captures four images per second (i.e., an image every 250 milliseconds), compresses each image and immediately sends one compressed image after another to the storage device for storage. Assuming that the average size of a compressed image is 2 megabytes (MB), the camera writes the image data into the storage device at a rate of 8 MB per second (MB/sec). In order to evaluate the status of the "Capture Multi-Shot Image" INSQ the storage device monitors data-write requests that it receives from the digital camera, and calculates the average rate at which the digital camera writes the images' compressed data into its storage space in order to decide whether data is written at the expected average rate of 8 MB/sec. If data is written at the expected average rate of 8 MB/sec, or at a higher rate, this means that the "Capture Multi-Shot Image" INSQ has started or it is in progress. Therefore, in this example the INSQ's BOS parameter is "Frequency of bursts writing at over 8 MB/s". If the "Capture Multi-Shot Image" INSQ is in progress the storage device may execute ISQ operations but avoid executing ESQ operations that were predefined for the "Capture Multi-Shot Image" INSQ.

Digital cameras transfer images to the storage device they work with in data bursts, where each data burst represents one image. In this example the BOS threshold of the "Capture Multi-Shot Image" INSQ will be kept to a minimum of three data write bursts that arrive one after another with a maximum delay of one millisecond between each two consecutive data bursts. If three sequential data bursts are received at the storage device (each data burst at a rate of 8 MB/sec) with a maximum delay of 1 millisecond, the storage device assumes that the "Capture Multi-Shot Image" INSQ is in progress. Accordingly, the INSQ's BOS threshold is "3 bursts separated at less than 1 millisecond".

If the status of the "Capture Multi-Shot Image" INSQ is "INSQ in progress", the storage device waits for an EOS indication because, as explained above, ESQ operations are allowed to be executed only after termination of the INSQ, which, in this example is the "Capture Multi-Shot Image" INSQ. In order to identify whether an EOS occurs, or has occurred, the storage device uses the INSQ's EOS threshold "Delay of over 3 milliseconds between bursts". In order to identify the EOS of the "Capture Multi-Shot Image" INSQ the storage device monitors data write requests that are received from the digital camera and checks whether the data write requests are provided at an average write rate that differs from 8 MB/sec, or whether there is a delay between two consecutive data bursts that exceeds three millisecond, which is the INSQ's EOS threshold in this example. If there is a delay that exceeds three milliseconds during which no data write requests are received at the expected rate (i.e., 8

MB/sec) at the storage device, the storage device assumes that the "Capture Multi-Shot Image" INSQ is no longer in progress (i.e., the INSQ has terminated), which means that the storage device may allow ESQ operations, which were predefined for the "Capture Multi-Shot Image" INSQ, to be executed and suspended ESQ operations to be resumed.

EXAMPLE 3

The Host Device is a Computer System

The third entry contains an exemplary INSQ called "Update Boot Image", which pertains to boot operations in a computer system. For the sake of the example it is assumed that the computer system updates a data file that is stored in sequential logical sectors starting from sector #0 (zero). If a sector's size is 512 bytes and the data file size is 10 kilobytes (KB), the data file is stored in a storage area consisting of twenty logical sectors (i.e., logical sectors #0 through #0, inclusive). The computer system updates the data file sequentially, by updating sector #0, then sector #0, and so on, until the last sector (i.e., sector #0) is updated.

In order to evaluate the status of the "Update Boot Image" INSQ the storage device monitors data-write requests that it receives from the computer system. If there is a write request to write data into sector #0, the storage device concludes that the "Update Boot Image" INSQ is in progress because the INSQ's BOS parameter is, in this example, "Writing to sector #0", and the INSQ's BOS threshold is "Occurrence of the event", which means that data is being, or about to be, written into sector #0. If the "Update Boot Image" INSQ is in progress, the storage device may execute ISQ operations but avoid ESQ operations that were predefined for the "Update Boot Image" INSQ.

When the last logical sector (in this example sector #0) of the data file is updated the storage device concludes that the "Update Boot Image" INSQ is no longer in progress, because the EOS parameter is "Writing to the last sector of the Boot image" and the INSQ's EOS threshold is "Occurrence of the event". That is, writing to the last sector once is sufficient for the storage device to determine that EOS has occurred. If the "Update Boot Image" INSQ is no longer in progress, the storage device may allow ESQ operations to be executed and suspended EXQ operations to be resumed.

EXAMPLE 4

The Host Device is a Computer System

The fourth entry contains an exemplary INSQ called "Reading Boot Image", which pertains to boot operations in a computer system. For the sake of the example it is assumed that the computer system reads a data file that is stored in sequential logical sectors starting from sector #0, as described above in connection with Example 3).

In order to identify the status of the "Reading Boot Image" INSQ, or a change thereof, the storage device monitors data-read requests that it receives from the computer system. If there is a read request to read data from sector #0, the storage device concludes that the "Read Boot Image" INSQ is in progress, because the BOS parameter is "Reading from sector #0", and the BOS threshold is "Occurrence of the event", which means that data reading from sector #0 is in progress. In such a case (i.e., the "Read Boot Image" INSQ is in progress) the storage device may execute ISQ operations but avoid ESQ operations that were predefined for the "Read Boot Image" INSQ.

When the last logical sector (in this example logical sector #19) of the data file is finally read the storage device concludes that the "Read Boot Image" INSQ is no longer in progress, because the EOS parameter is "Reading the last sector of the Boot image" and the EOS threshold is "Occurrence of the event". That is, reading the last sector is sufficient for the storage device to conclude that the "Read Boot Image" INSQ is no longer in progress. In such a case (i.e., the "Read Boot Image" INSQ is no longer in progress) the storage device may allow ESQ operations to be executed and suspended EXQ operations to be resumed.

INSQ table 40, which contains static parameters, may be provided to the storage device (and, if desired, updated) by a remote device or computer system, for example by using a dedicated Application Programming Interface ("API"). A dedicated API may used, for example, to update or delete an existing table entry, or to add a new table entry, and so on. Briefly, "API" is a source code interface that can be provided by an operating system, a library or a service to support requests made by computer programs. Alternatively, INSQ table 40 may be handled (i.e., created and stored) at the time of manufacturing of the storage devices, or by a software developer at the storage device's customization stage. INSQ table 40 may be handled (i.e., created, stored, modified, and updated) during runtime by an application that runs on the host device. The customization requirements may pertain to, or be derived from, applications running on the related host device, usage scenarios, system features, and so on.

FIG. 5 shows an INSQ table 50 according to an example embodiment of the present disclosure. INSQ table 50, which contains INSQs' dynamic parameters, includes four exemplary entries, numbered 1 through 4, each of which accommodates one INSQ and INSQ-related parameters, as described below. The parameters held in INSQ table 50 are dynamically collected and updated by the storage device during runtime (i.e., "on-the-fly"), responsive to (i.e., derived from) commands issued by the host device to the storage device with regard to the service rendered by the host device. For example, if the host device is an MP3 player, the commands the MP3 player sends to the storage device can be associated with playing back an audio file. Exemplary dynamic parameters are shown in FIG. 5, described below.

INSQ table 50 of FIG. 5 contains exemplary dynamic parameters, which are related to the four exemplary INSQs in INSQ table 40 of FIG. 4, and four exemplary fields for holding these parameters, as follows:

(1) "INSQ's identifier" (shown at 501). This field accommodates the types of INSQs or the names that have been assigned to the INSQs. As mentioned above, INSQ table 50 relates to the four exemplary INSQs of INSQ table 40. Therefore, INSQ table 50 uses the same INSQs' types or names as table 40.

(2) "Status (On/Off)" (shown at 502). The value (i.e., "On" or "Off") stored in this field specifies whether an INSQ is in progress or not. That is, if the INSQ is currently in progress, the value assigned to it would be "On", and if the INSQ is currently not in progress, the value assigned to it would be "Off".

(3) "Dynamic BOS parameter" (shown at 503). If an INSQ is not in progress (i.e., its status in the "Status (On/Off)" field is "Off"), the storage device "waits" for (i.e., expects) the INSQ to begin. Therefore, the storage device calculates or evaluates the value that is to be held in the "Dynamic BOS parameter" field, in order to decide whether a BOS indication has occurred. The dynamic BOS parameters are calculated by the storage device based on one or more commands that the storage device receives from the host device.

(4) "Dynamic EOS parameter" (shown at 504). If an INSQ is in progress (i.e., its status in the "Status (On/Off)" field is "On"), the storage device "waits" for (i.e., expects) the INSQ to terminate. Therefore, the storage device calculates the value of the EOS parameter that is to be held in the "Dynamic EOS parameter" field. The dynamic EOS parameters are calculated by the storage device based on one or more commands that the storage device receives from the host device.

Continuing Example 1 above, the current status INSQ called "Play MP3", shown at 510, is "On" (shown at 515), meaning that the INSQ is in progress. Therefore, the storage device does not have to calculate the BOS parameter, for which reason the value currently held in the "Dynamic BOS parameter" field is "N/A" (i.e., Not Applicable). As explained above, if an INSQ is "On", the storage device expects the INSQ to terminate. Therefore, the storage device evaluates, calculates, or checks the dynamic EOS parameter in order to assess whether an EOS is occurring or has occurred. If the storage device decides that an EOS is occurring or has occurred, the storage device changes the status of the "Play MP3" INSQ from "On" to "Off", and evaluates, calculates, or checks the dynamic BOS parameter in order to assess whether a BOS is occurring or has occurred.

In other words, the dynamic BOS parameter pertaining to the "Play MP3" INSQ is not applicable (shown as "N/A" at 520) when the "Play MP3" INSQ is currently active (i.e., it is "On" at 515), which means that the current value of the dynamic EOS parameter has to be considered, which, in this example, is "12 milliseconds". As the "Play MP3" INSQ proceeds, the value of this dynamic EOS parameter increases and when it reaches or exceeds the static EOS threshold value "Not streaming for at least 1 second" (which is specified in INSQ table 40), the storage device decides that EOS has occurred. If the "Play MP3" INSQ was inactive (i.e., if it was "Off"), the parameter to be considered would have been the dynamic BOS parameter rather than the dynamic EOS parameter.

As shown in INSQ table 40 the EOS threshold for the "Play MP3" INSQ is "1 second" (shown at 425 in FIG. 4), which means that the average rate 420 (the criteria being shown in FIG. 4) at which the MP3 player reads data from the storage device has to continuously deviate from the standard rate (i.e., 16 KB/s) for a duration of at least one second in order for the storage device to decide that an EOS has occurred. However, as shown in FIG. 5, only 12 milliseconds (shown at 525 in FIG. 5) have elapsed since the beginning of the current "Play MP3" INSQ. Therefore, the "Play MP3" INSQ is still considered by the storage device to be in the "On" state.

Continuing Example 2 above, the current status of the second INSQ called "Capture Multi-Shot Image" is "On", meaning that the INSQ is in progress. Therefore, the storage device does not have to calculate the BOS parameter, for which reason the value currently held in the "Dynamic BOS parameter" field is "N/A" (i.e., Not Applicable). As explained above if an INSQ is "On", the storage device expects the INSQ to terminate and, therefore, it evaluates, calculates, or checks the dynamic EOS parameter in order to assess whether an EOS is occurring. If the storage device decides that an EOS has occurred, the storage device changes the status of the "Capture Multishot Image" INSQ from "On" to "Off", and evaluates, calculates, or checks the dynamic BOS parameter in order to assess whether a BOS has occurred.

In other words, the dynamic BOS parameter pertaining to the "Capture Multishot Image" INSQ is not applicable because the "Capture Multishot Image" INSQ is currently active (i.e., it is "On"), which means that the current value of the dynamic EOS parameter has to be considered, which, in this example, is "2.03 milliseconds". As the "Capture Multishot Image" INSQ continues to proceed, the value of this dynamic EOS parameter increases and when it reaches or exceeds the static EOS threshold value "Delay of over 3 milliseconds between bursts" (which is specified in INSQ table 40), the storage device decides that EOS is occurring or has occurred. If the "Capture Multishot Image" INSQ was inactive (i.e., if it was "Off"), the parameter to be considered would have been the dynamic BOS parameter rather than the dynamic EOS parameter.

As shown in INSQ table 40 the EOS threshold for the "Capture Multishot Image" INSQ is "Delay of over 3 milliseconds between bursts", which means that the delay between data writing bursts (the criteria being shown in FIG. 4, in field 44) must exceed 3 milliseconds in order for the storage device to decide that an EOS has occurred. However, as shown in FIG. 5, the maximum delay calculated or measured so far by the storage device is only 2.03 milliseconds, for which reason the "Capture Multishot Image" INSQ is still considered by the storage device to be in the "On" state.

Continuing Example 3 above, the current status of the third INSQ called "Update Boot Image" INSQ is "Off", meaning that the INSQ is inactive or not in progress. Therefore, the storage device does not calculate the dynamic EOS parameter but, rather, it calculates, evaluates or checks, the dynamic BOS parameter in order to assess whether a BOS has occurred. If a BOS has occurred the storage device changes the status of the "Update Boot Image" INSQ from "Off" to "On" and evaluates, calculates, or checks the dynamic EOS parameter in order to assess whether an EOS has occurred.

As shown in INSQ table 40 the BOS threshold for the "Update Boot Image" INSQ is "Occurrence of the event" (the "event" referring to writing of data into sector #0), which means that data must be written into sector #0 in order for the storage device to decide that a BOS has occurred. However, as shown in FIG. 5, writing data into sector #0 has not occurred yet (referred to as "Did not happen" in FIG. 5), for which reason the "Update Boot Image" INSQ is still considered by the storage device to be in the "Off" state.

Continuing Example 4 above, the status of the fourth INSQ called "Read Boot Image" INSQ is "Off", meaning that the INSQ is inactive (i.e., the INSQ is not in progress). Therefore, the storage device does not calculate the EOS parameters but, rather, it calculates or checks the BOS parameter and in order to assess whether a BOS has occurred. If a BOS has occurred, the storage device changes the status of the "Read Boot Image" INSQ from "Off" to "On" and evaluates, calculates, or checks the dynamic EOS parameter in order to assess whether an EOS has occurred.

As shown in INSQ table 40 the BOS threshold for the "Read Boot Image" INSQ is "Occurrence of the event" (the "event" referring to reading data from sector #0), which means that data must be read from sector #0 in order for the storage device to decide that a BOS has occurred. However, as shown in FIG. 5, reading data from sector #0 has not occurred yet (referred to as "Did not happen" in FIG. 5), for which reason the "Read Boot Image" INSQ is still considered by the storage device to be in the "Off" state.

Figure 6:
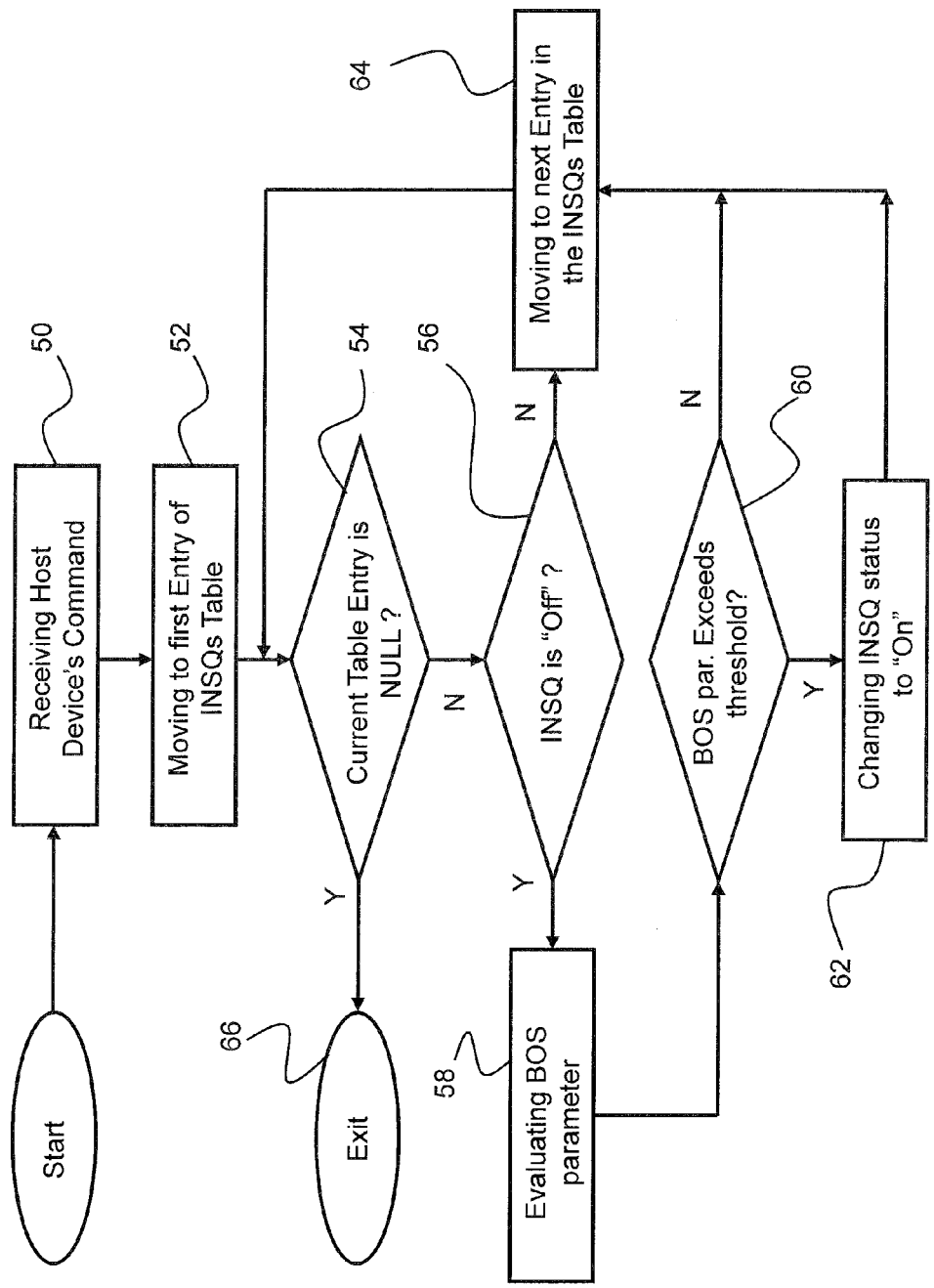
FIG. 6 shows a method usable by a storage device for changing the state of an INSQ from "Off" to "On" according to an example embodiment of the present disclosure.

FIG. 6 shows a method usable by a storage device for changing the status of an INSQ from "Off" (i.e., from "INSQ is not in progress" state) to "On" (i.e., to "INSQ is in progress" state) according to an example embodiment of the present disclosure. A host device (e.g., an MP3 player) may issue and forward one or more commands to a storage device, which pertain to an INSQ. A command may be a data-reading request or a data-writing request. A data-reading request and a data-writing request may be related to, or associated with, an INSQ.

At step 50 a storage device receives a host device's command (e.g., a play back command). Responsive to receiving the host device's command the storage device commences an INSQs check routine to check INSQs pre-listed in its INSQ table, to see if any of the listed INSQs is related to, or affected by, the received command. That is, the storage device checks whether the received command has an effect on the current status or state of any of the pre-listed INSQs. The INSQ table used by the storage device may be structure-wise identical or similar to INSQ tables 40 and 50 of FIGS. 4 and 5, respectively.

At step 52 the storage device starts checking (i.e., by using the INSQs check routine) the INSQ table by checking the first table's entry, and, at step 54, the storage device checks whether the first entry of the INSQ table is "null", where "null" indicates the end of the INSQ table. If the first entry is null (shown as "Y" at step 54), the process is aborted (shown as "Exit" at 66) because the INSQ table is empty, or the entire INSQs have already been checked by the storage device in respect of the received command.

If the first entry is not null (shown as "N" at step 54), this means that the entry contains an INSQ whose status is yet to be evaluated, or reevaluated, by the storage device based on the currently received command (or based on the currently received command and on one or more previously received commands) and the definitions and characteristics (e.g., conditions, thresholds, etc.) related to the currently evaluated INSQ. That is, the storage device has to decide whether the state of the INSQ in question has to change because of the one or more commands that the storage device has received from the host device.

At step 56 the storage device checks whether the INSQ's current status is "Off". If the current status of the INSQ is "Off" (shown as "Y" at step 56), this means that the INSQ is inactive (i.e., it is not in progress) and, therefore, the storage device waits in anticipation for a change to occur in the INSQ's state; that is, from inactive state (i.e., "INSQ not in progress") to active state (i.e., "INSQ in progress").

Accordingly, at step 58 the storage device measures, checks or estimates the BOS parameter and checks, at step 60, whether the currently measured, checked or estimated BOS parameter exceeds the BOS threshold specified in the INSQ table. If the BOS parameter exceed the BOS threshold (shown as "Y" at step 60), this indicates to the storage device that the status of the currently evaluated INSQ is changing, or has recently changed, from "inactive" to "active" (i.e., the INSQ is now in progress) and, therefore, the storage device does not execute any new ESQ operation that is associated with that INSQ, or, if an ESQ operation is in progress when the INSQ changes states (i.e., from "inactive" to "active"), the storage device suspends that ESQ operation and resumes ISQ operations that are related to the INSQ in question, as shown in FIG. 2. In addition, the storage device updates the INSQ table by changing, at step 62, the status of the INSQ from "Off" to "On". Thereafter, the storage device moves on, at step 64, to the next entry (i.e., the second entry so far) of the INSQ table, and the process described in connection with the first entry of the INSQ table is repeated for the second entry and for the remaining INSQs, until a null entry is encountered at step 54, which terminates the INSQs evaluation process. The same INSQs evaluation process may be repeated for each command that the storage device receives from the host device. If the BOS threshold is not exceeded (shown as "N" at step 60), this means that the INSQ in question is still inactive and, therefore, its current state (i.e., "Off") should remain unchanged. Therefore, the storage device does not change the INSQ state and evaluates the status of the next INSQ.

Figure 7:
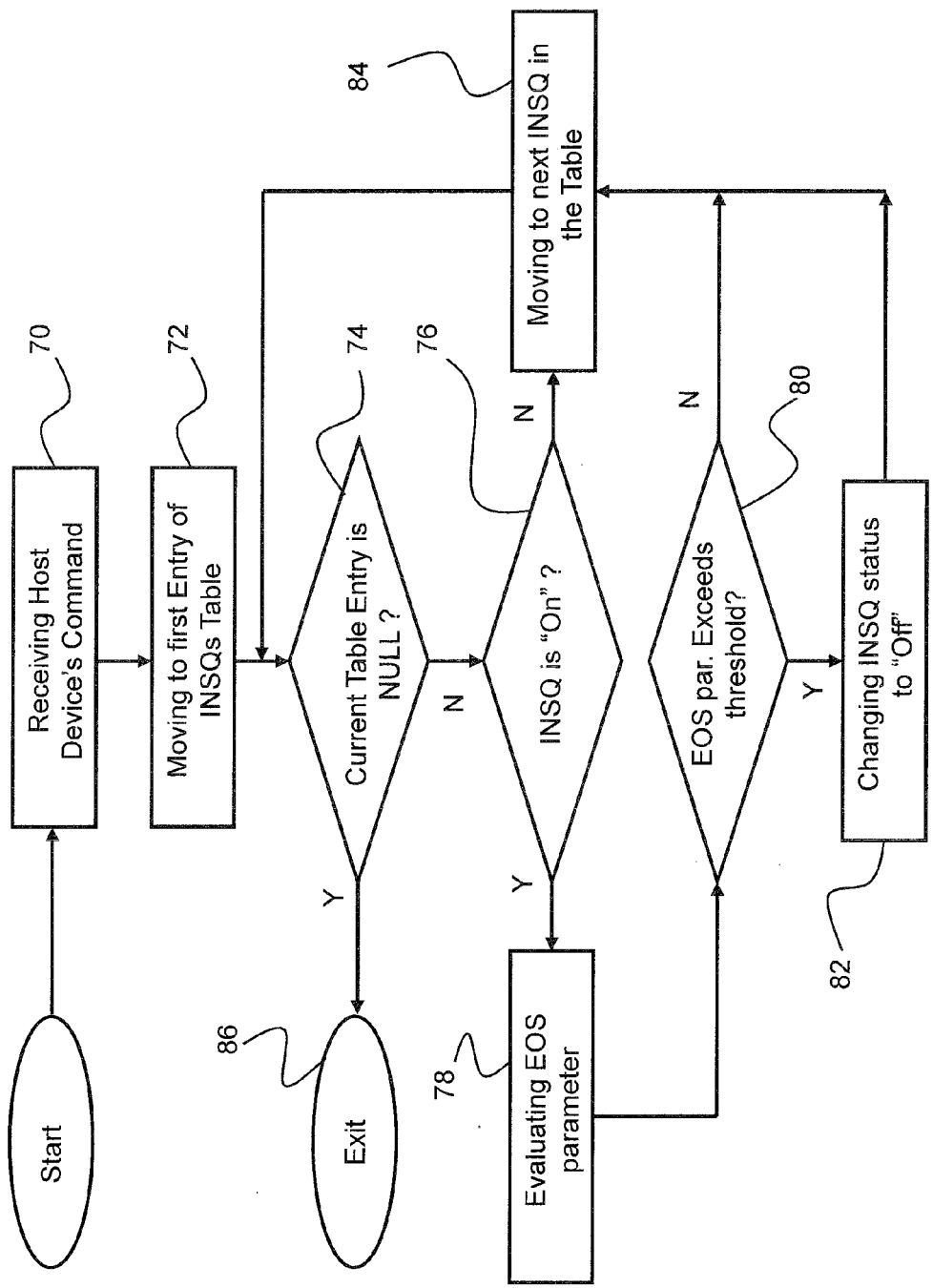
FIG. 7 shows a method usable by a storage device for changing the status of an INSQ from "On" to "Off" according to an example embodiment of the present disclosure.

FIG. 7 shows a method usable by a storage device for changing the status of an INSQ from "On" (i.e., from "INSQ is in progress" state) to "Off" (i.e., to "INSQ is not in progress" state) according to an example embodiment of the present disclosure. A host device (e.g., an MP3 player) may issue and forward one or more commands to a storage device, which pertain to an INSQ. A command may be a data-reading request or a data-writing request. A data-reading request and a data-writing request may be related to, or associated with, an INSQ.

At step 70 a storage device receives a host device's command (e.g., a play back command). Responsive to receiving the host device's command the storage device commences an INSQs check routine to check INSQs pre-listed in its INSQ table, to see if any of the listed INSQs is related to, or affected by, the received command. That is, the storage device checks whether the received command has an effect on the current status or state of any of the pre-listed INSQs. The INSQ table used by the storage device may be structure-wise identical or similar to INSQ tables 40 and 50 of FIGS. 4 and 5, respectively.

At step 72 the storage device starts checking (i.e., by using the INSQs check routine) the INSQ table by checking the first table's entry, and, at step 74, the storage device checks whether the first entry of the INSQ table is "null", where "null" indicates the end of the INSQ table. If the first entry is null (shown as "Y" at step 74), the process is aborted (shown as "Exit" at 86) because the INSQ table is empty, or the entire INSQs have already been checked by the storage device in respect of the received command.

If the first entry is not null (shown as "N" at step 74), this means that the entry contains an INSQ whose status is yet to be evaluated, or reevaluated, by the storage device based on the currently received command (or based on the currently received command and on one or more previously received commands) and the definitions and characteristics (e.g., conditions, thresholds, etc.) related to the currently evaluated INSQ. That is, the storage device has to decide whether the state of the INSQ in question has to change because of the one or more commands that the storage device received from the host device.

At step 76 the storage device checks whether the INSQ's current status is "On". If the current status of the INSQ is "On" (shown as "Y" at step 76), this means that the INSQ is active (i.e., it is in progress) and, therefore, the storage device waits in anticipation for a change to occur in the INSQ's state; that is, from active state (i.e., "INSQ in progress") to inactive state (i.e., "INSQ is not in progress").

Accordingly, at step 78 the storage device measures, checks or estimates the BOS parameter and checks, at step 80, whether the currently measured, checked or estimated BOS parameter exceeds the BOS threshold specified in the INSQ table. If the BOS parameter exceed the BOS threshold (shown as "Y" at step 80), this indicates to the storage device that the status of the currently evaluated INSQ is changing, or has recently changed, from "active" to "inactive" (i.e., the INSQ is not in progress) and, therefore, the storage device the storage device suspends ISQ operations and resumes ESQ operations related to the INSQ in question, as shown in FIG. 3, and, in addition, changes, at step 82, the status of the INSQ from "On" to "Off".

In addition, the storage device updates the INSQ table by changing, at step 82, the status of the INSQ from "On" to "Off. Thereafter, the storage device moves on, at step 84, to the next entry (i.e., the second entry so far) of the INSQ table, and the process described in connection with the first entry of the INSQ table is repeated for the second entry and for the remaining INSQs, until a null entry is encountered at step 74, which terminates the INSQs evaluation process. The same INSQs evaluation process is repeated for each command that the storage device receives from the host device.

If the EOS threshold is not exceeded (shown as "N" at step 80), this means that the INSQ in question is still active and, therefore, its current state (i.e., "On") should remain unchanged. Therefore, the storage device does not change the INSQ state and evaluates the status of the next INSQ.

Figure 8:
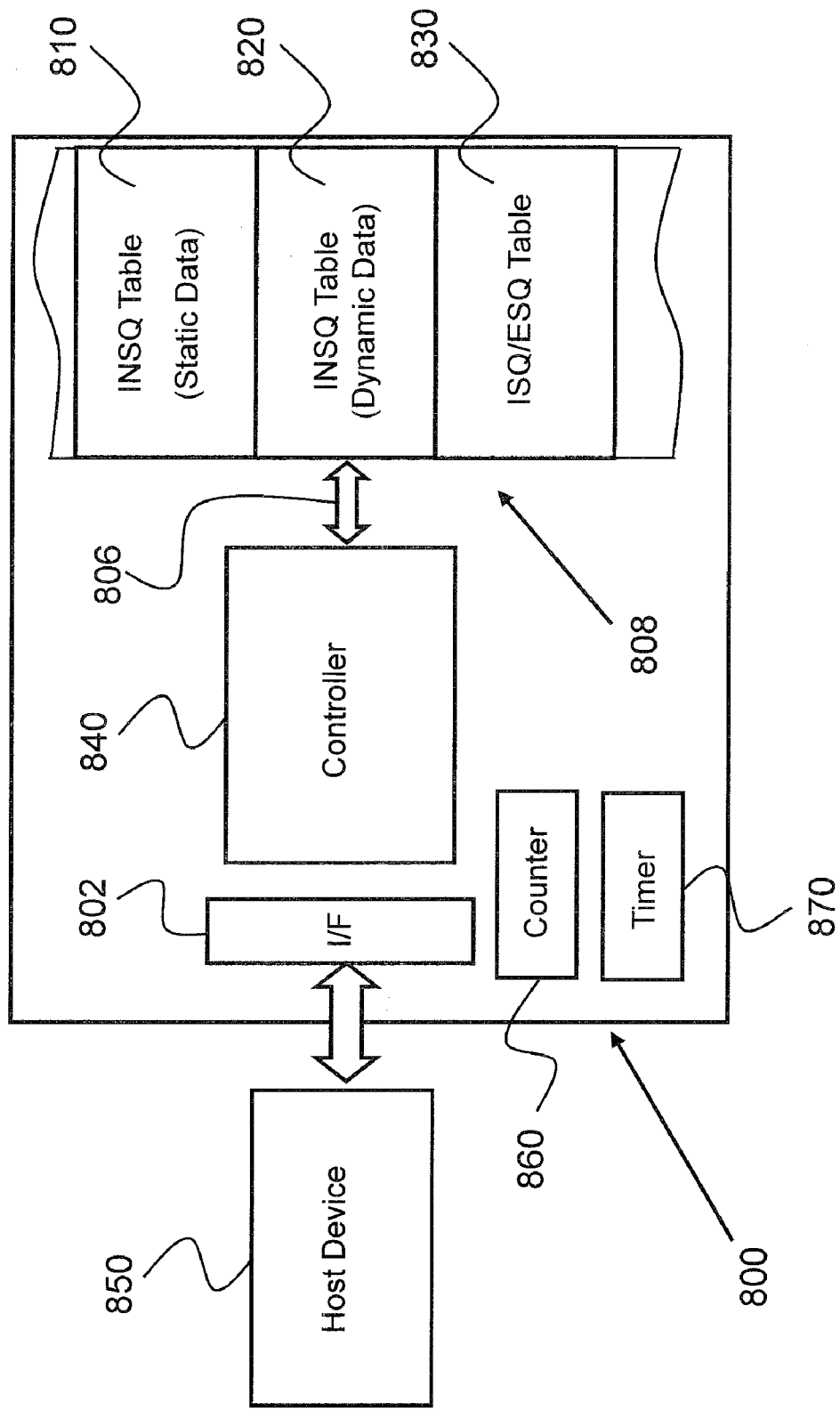
FIG. 8 is a block diagram of a storage device according to an example embodiment of the present disclosure.

FIG. 8 shows a storage device 800 according to an example embodiment of the present disclosure. Storage device 800 includes a mass storage area 808, which may be a flash memory, a controller 840 that manages mass storage area 808 via data and control lines 806 and communicates with host device 850 via host interface 802. Controller 840 controls all of the data storage and data retrieval to/from mass storage area 808 and data transfer to/from host device 850 by controlling, for example, "read", "write" and "erase" operations and by controlling communication with host device 850. Controller 840 also performs internal "housekeeping" operations such as wear leveling, etc. These activities of controller 840 are known in the art A portion of mass storage area 808 may be used to hold a static INSQ table 810, a dynamic INSQ table 820, and an ISQ and ESQ table 830. Static INSQ table 810 may contain a list of predefined INSQs and static INSQs' BOS and EOS parameters and threshold values related to the predefined INSQs. Dynamic INSQ table 820 may contain an identical list of the predefined INSQs, or entries of INSQ table 820 may be associated with the INSQs held in INSQ table 810. Dynamic INSQ table 820 may additionally contain dynamic INSQs' BOS and EOS parameters and threshold values related to the predefined INSQs.

ISQ and ESQ table 830 may contain multiple first sets of internal operations (i.e., multiple sets of ESQ operations) and multiple second sets of internal operations (i.e., multiple sets of ISQ operations) that are respectively associated with, or related to, the predefined INSQs. That is, with each INSQ of the predefined INSQs are associated a first set of operations and a second set of operations. Static INSQ table 810 may be identical or similar to the INSQ table of FIG. 4, and dynamic INSQ table 820 may be identical or similar to the INSQ table of FIG. 5. Static INSQ table 810 and dynamic INSQ 820 may be regarded as one INSQ table and, in general, INSQ table 810, INSQ table 820 and ISQ and ESQ table 830 may be part of, or managed as, one relational database. Static information, such as static parameters and threshold values should be held in a non-volatile memory, whereas dynamic information, such as dynamic BOS related values, dynamic EOS related values and current status of INSQs, can be held in a volatile memory such as a Random Access Memory ("RAM") (or in a non-volatile memory).

Host device 850 sends storage commands to storage device 800 and, for each of the commands that the storage device receives, controller 840 searches in lookup tables 810 and 820 for an INSQ to which the command belongs, or with which the command can be associated. If controller 840 finds such an INSQ in lookup INSQ tables 810 and 820, controller 840 updates in dynamic INSQ table 820 the value of dynamic parameters that belong to that INSQ and, based on static threshold values that are held in static INSQ table 810, determines at which state (i.e., "INSQ is in progress" or "INSQ is not in progress") the INSQ is in, or whether the INSQ has changed, or is about to change, its state. If controller 840 determines that the INSQ has changed, or is about to change, its state, controller 840 looks in lookup table ISQ/ESQ table 830 whether there are ISQ or ESQ operations associated with the INSQ that should be allowed to be executed or resumed, or should be avoided or suspended, as the case may be.

In other words, controller 840 is adapted to use one or more storage commands, which are received from host device 850, to determine whether any of the one or more of the predefined INSQs is transitioning, or has transitioned, from the "inactive" state to the "active" state or from the "active" state to the "inactive state", and, responsive to a predefined INSQ transitioning from the "inactive" state to the "active" state, controller 840 avoids or suspends execution of the ESQ operations pertaining to that INSQ and allows or performs execution of ISQ operations pertaining to the that INSQ.

Responsive to an INSQ transitioning from the "active" state to the "inactive" state controller 840 allows or resumes execution of the ESQ operations and avoids or suspends execution of the ISQ operations. Controller 840 determines transitions of an INSQ from "inactive" state to "active" state and from "active" state to "inactive" state by determining whether one or more commands that are received from the host device, and/or information derived from the one or more commands, satisfy predefined BOS conditions or EOS conditions, as described herein, for example in connection with tables 40 and 50 of FIGS. 4 and 5, respectively. Controller 840 determines whether the command(s) and/or the information derived from the command(s) satisfy the predefined BOS conditions or the EOS conditions by comparing values, or accumulated values, of dynamic variables/parameters to predefined static parameters (i.e., to preset conditions).

Controller 840 may use a counter such as counter 860 to count events relating to, or events derived from, one or more commands that the storage device receives from the host device. Controller 840 may have a timer such as timer 870 to perform various time-related calculations, for example, data read rate and data write rate.

Figure 9:
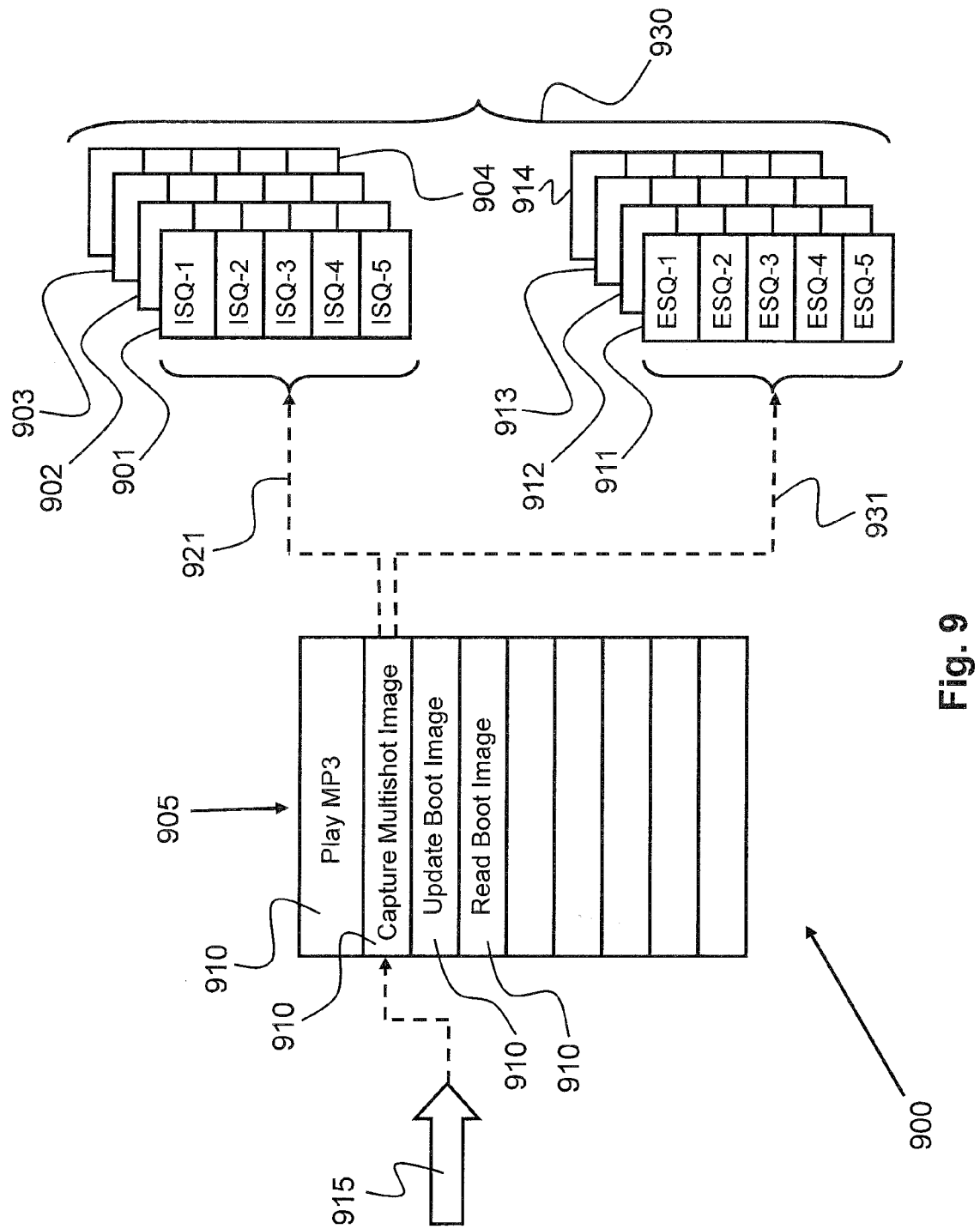
FIG. 9 shows a database used by a storage device's controller according to an example embodiment of the present disclosure.

FIG. 9 schematically illustrates using a database 900 by a controller of a storage device according to an example embodiment of the present disclosure. Lookup table 905 contains an exemplary list of four predefined INSQs 910. Although not shown in FIG. 9, lookup table 905 also contains parameters and thresholds of, or similar to, the type held in lookup tables 810 and 820 of FIG. 8, which parameters and thresholds are associated with exemplary INSQs 910. Lookup table 930, which may be identical or similar to ISQ/ESQ table 830 of FIG. 8, contains an exemplary list of ISQ and ESQ operations that are associated with predefined INSQs 910. For example, ISQs 901 and ESQ 911 are associated with INSQ 910 called "Capture Multishot Image", ISQs 902 and ESQs 912 may be associated with INSQ 910 called "Play MP3", ISQs 903 and ESQs 913 may be associated with INSQ 910 called "Update Boot Image", and ISQs 904 and ESQs 914 may be associated with INSQ 910 called "Read Boot Image".

A storage command is issued and sent by a host device, such as host device 850 of FIG. 8, and received at a storage device such as storage device 800 of FIG. 8, the storage command being symbolically shown at 915 as an arrow. Responsive to receiving storage command 915 the storage device's controller checks whether storage command 915 belongs to, or can be associated with, any one of INSQ 910. In the example shown in FIG. 9 the received storage command 915 is found to belong to, or it can be associated with, INSQ 910 called "Capture Multishot Image" (the association shown by dashed line 920).

As explained above in connection with table 50 of FIG. 5, the dynamic INSQ table holds the current status (i.e., "On" or "Off") for each predefined INSQ, and, for a given INSQ, the storage device's controller checks the EOS parameter(s) and EOS threshold(s) if INSQ in question is "On". Otherwise (i.e., the INSQ in question is "Off"), the storage device's controller checks the BOS parameter(s) and BOS threshold(s) associated with that INSQ. Referring again to FIG. 9, by updating the dynamic parameter(s) associated with the "Capture Multishot Image" INSQ and scrutinizing the corresponding threshold value(s) the storage device's controller "knows" whether the "Capture Multishot Image" INSQ is changing, or has changed, its state, from "On" to "Off" or from "Off" to "On".

If the "Capture Multishot Image" INSQ is changing, or has changed, its state, from "On" to "Off", this means that ISQ operations are to be avoided or suspended and ESQ operations are allowed to be executed or their execution should be resumed. If the "Capture Multishot Image" INSQ is changing, or has changed, its state, from "Off" to "On", this means that ISQ operations should be allowed or resumed or executed and ESQ operations must be avoided or suspended. Accordingly, the storage device controller searches in ISQ/ESQ lookup table 930 for the ISQ and ESQ operations relevant to the INSQ "Capture Multishot Image". As mentioned above, ISQ operations 901 and ESQ 911 are associated with the "Capture Multishot Image" INSQ, the associations being respectively shown as dashed lines 921 and 931. ISQ operations 901 include ISQ operations designated as "ISQ-1", "ISQ-2", "ISQ-3", "ISQ-4", and "ISQ-5". ISQ operation "ISQ-1" may be, for example, an operation, or a set of operations, involved, for example, in predicting and caching anticipated data. ESQ operations 911 include ESQ operations designated as "ESQ-1", "ESQ-2", "ESQ-3", "ESQ-4", and "ESQ-5". ESQ operation "ESQ-1" may be, for example, an operation, or a set of operations, involved, for example, in static wear leveling. The type of the EOS and BOS parameters and their threshold values, and the type of ISQ and ESQ operations, are set or chosen for each predefined INSQ according to the type of the INSQ. The appropriate setting or choosing of these parameters, threshold values, and types of operations are known in the art.

Figure 10:
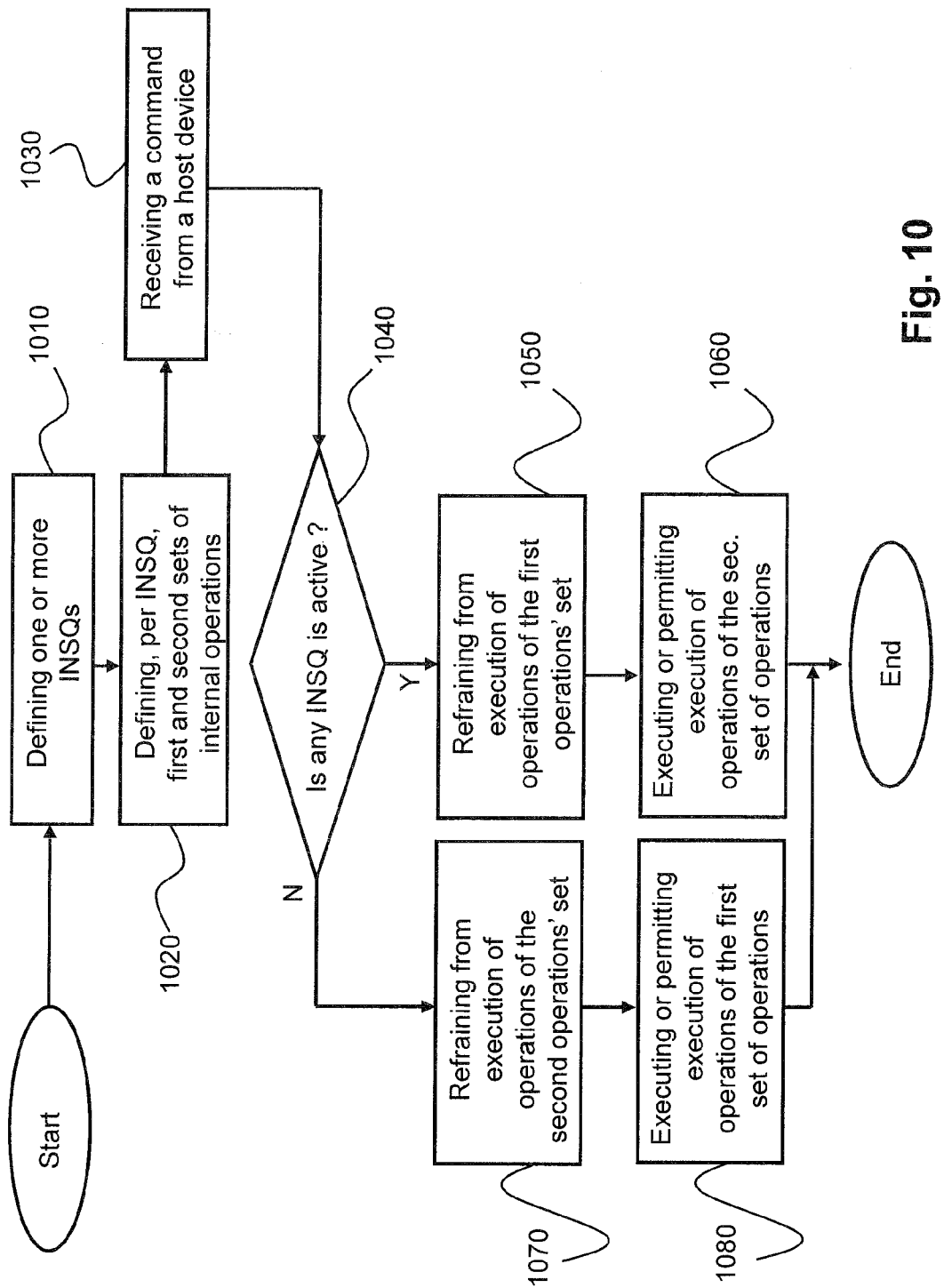
FIG. 10 shows a method usable by a storage device according to an example embodiment of the present disclosure.

FIG. 10 shows a method usable by a storage device according to an example embodiment of the present disclosure. At step 1010 one or more integral sequences of commands are defined, where each of the one or more defined integral sequences of commands is capable of being in an "active" state and in an "inactive" state. At step 1020 a first set of internal operations ("ESQ") and a second set of internal operations ("ISQ") are defined for, and associated with, each of the one or more defined integral sequences of commands, where a first set of internal operations includes operations that are not to be executed while the respective integral sequence of commands is in the "active" state, and a second set of internal operations includes operations that are permitted to be executed or are to be executed while the respective integral sequence of commands is in the "active" state.

At step 1030 the storage device receives a command from a host device, and at step 1040 it is determined, based on information derived from the received command, and possibly from previously received commands, whether any one of the one or more defined integral sequences of commands is in the "active" state, or is transitioning from the "inactive" state to the "active" state.

If the any one of the one or more defined integral sequences of commands is in the "active" state, or is transitioning from the "inactive" state to the "active" state (shown as "Y" at step 1040), then, at step 1050 any operation of the first set of internal operations (i.e., ESQ operations) defined for, and associated with, that active integral sequence of commands is refrained from being executed, or its execution is suspended, and, at step 1060, operation or operations of the second set of internal operations (i.e., ISQ operations) associated with that active integral sequence of commands is/are permitted to be executed if execution thereof has not yet started, or their execution is permitted to be continued if their execution was suspended. In some cases, it may even be highly recommended or desirable to execute certain operations that have some or a significant positive contribution to the efficiency of the storage device or to the storage system as a whole.

However, if the any one of the one or more defined integral sequences of commands is not in the "active" state, or it is not transitioning from the "inactive" state to the "active" state (shown as "N" at step 1040); i.e., the integral sequence is in the inactive state, then, at step 1070 any operation of the second set of internal operations (ISQ) defined for, and associated with, the inactive integral sequence of commands is refrained from being executed, and, at step 1080, operations of the first set of internal operations (ESQ) defined for, and associated with, that inactive integral sequence of commands are permitted to be executed. Regarding step 1040, determination whether a certain INSQ is active or inactive is made after checking whether the current status of the INSQ is "On" (or it's status is transitioning from "Off" to "On") or "Off" (or it's status is transitioning from "On" to "Off"), as described in more detail in connection with FIGS. 6 and 7, respectively.

At least one of the one or more defined integral sequences of commands may be associated with playing back of multimedia content, or with capturing multimedia content or images, or with data synchronization, or with a boot command.

Each of the first set (ESQ) and second set (ISQ) of internal operations defined for, and associated with, an INSQ may include any of the following operations: flash management operation; encryption/decryption of outgoing/incoming data; compression/decompression of outgoing/incoming data; anti-virus operation; defragmentation operation; backing up data; and changing data format. A flash management operation may involve: garbage collection; activating an error correction mechanism; caching data into a fast flash storage area of the storage device; flushing cached data; using low power mode; and static wear leveling.

In one example "low-power mode" operations can be allowed while an INSQ associated with playing back a music file is in progress (i.e., active). That is, if an MP3 player, an exemplary host device, plays back a music file, the storage device can use the "low power mode" while the storage device is receiving an INSQ (i.e., a series of commands) for playing back the music file. Because playing back a music file requires reading the music file at a constant bit rate of, about, around or near 16 KB/sec., the low-power mode operation(s) may be allowed only if execution thereof does not detrimentally affect the specified bit rate (i.e., 16 KB/sec.). An internal operation (ISQ) may be "allowed", "recommended", or "mandatory" with respect to a given INSQ. In this example "low power mode" operations are "allowed", which means that executing or refraining from executing these operations, while an "MP3 play" INSQ is in progress, does not have much negative or positive contribution on the overall performance of the storage system as a whole.

In one example the storage device can use an error correction mechanism to enhance data reading reliability while a host device is reading the operating system's ("OS's") bit image from the storage device. Reading the OS image may be defined as an INSQ, and error correction operations may be defined for the OS image reading INSQ. In this example "OS image reading" operations are "recommended" because, to the extent possible, it is recommended that actions to improve reliability of a data reading process be taken.

In one example the storage device can use data caching operations while a digital camera, an exemplary host device, is storing multi-shot pictures in the storage device. Storing multi-shot pictures in the storage device may be defined as an INSQ, and data caching operations may be defined for the multi-shot pictures storing INSQ. In this example "data caching" operations are "mandatory" because the rate at which the digital camera transfers pictures to the storage device is higher than the speed at which the storage device can store the pictures.

Some operations are not recommended or should be avoided if an INSQ is in progress. In one example executing an anti-virus operation is not recommended while an MP3 player is playing back a music file because executing anti-virus operations under such circumstances might result in an audible hiccups-like interference. In one example executing a garbage collection operation must be avoided while a digital camera is storing multi-shot pictures in a storage device because executing garbage collection operations under such circumstances might result in lost or corrupted pictures.

It is noted that an internal operation can be permitted to be executed, or may be recommended or mandatory while some INSQs are in progress, whereas the same internal operation may have to be avoided or may be not recommended while some other INSQs are in progress. Therefore, such an internal operation may be simultaneously defined as an operation of a first set of internal operations (ESQ) that are defined for one INSQ, and as an operation of a second set of internal operations (ISQ) that are defined for another FNSQ.

For example, execution of an error correction operation is recommended for an INSQ that involves updating an OS bit image, but it must be avoided in cases where an INSQ involves playing back a music file, because executing error correction operations consume a considerable electrical power and computational resources.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb. The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably with, the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, less modules, and/or functionally equivalent modules. For example a storage device may use more, less, different, additional, or alternative criteria to decide whether EOS or BOS has occurred.

What is claimed is:

1. A method of handling internal operations of a storage device, the method comprising:
    defining an integral sequence of commands capable of being in one of an active state and an inactive state;
    associating with the integral sequence of commands a first set of internal memory management operations each of which is an extra-sequence operation, and a second set of internal memory management operations each of which is an intra-sequence operation, wherein the first set of internal, memory management operations is prohibited from being executed while the integral sequence of commands is in the active state and the second set of internal memory management operations is permitted to be executed while the integral sequence of commands is in the active state;
    receiving a command from a host device when the storage device is coupled to the host device;
    in response to the received command, determining when the integral sequence of commands is in the active state or is transitioning from the inactive state to the active state; and
    when the integral sequence of commands is in the active state or is transitioning from the inactive state to the active state, refraining from executing any operation of the first set of internal memory management operations.

2. The method according to claim 1, further comprising permitting execution of any operation of the second set of internal memory management operations when the integral sequence of commands is in the active state or is transitioning from the inactive state to the active state.

3. The method according to claim 1, further comprising:
    when the integral sequence of commands is in the inactive state or is transitioning from the active state to the inactive state, permitting execution of an operation of the first set of internal operations and, refraining from executing any operation of the second set of internal operations.

4. The method according to claim 3, wherein determining a transition of the integral sequence of commands from the inactive state to the active state, or from the active state to the inactive state includes determining whether information derived from the received command satisfies predefined beginning-of-sequence conditions or end-of-sequence conditions, respectively.

5. The method according to claim 1, wherein the integral sequence of commands is associated with playing back of multimedia content.

6. The method according to claim 1, wherein the integral sequence of commands is associated with capturing multimedia content or images.

7. The method according to claim 1, wherein the integral sequence of commands is associated with data synchronization.

8. The method according to claim 1, wherein the integral sequence of commands is associated with a boot command.

9. The method according to claim 1, wherein an operation of the first set of internal memory management operations is selected from the group consisting of:
    flash memory management operation;
    encryption/decryption of outgoing/incoming data;
    compression/decompression of outgoing/incoming data;
    anti-virus operation;
    defragmentation operation;
    ruggedization;

backing up data;
changing data format;
garbage collection;
employing an error correction mechanism;
caching data into a fast flash storage area;
flushing cached data;
low power mode operation; and
static wear leveling.

10. The method according to claim 1, wherein an operation of the second set of internal memory management operations is selected from the group consisting of:
flash memory management operation;
encryption/decryption of outgoing/incoming data;
compression/decompression of outgoing/incoming data;
anti-virus operation;
defragmentation operation;
ruggedization;
backing up data;
changing data format;
garbage collection;
employing an error correction mechanism;
caching data into a fast flash storage area;
flushing cached data;
low power mode operation; and
static wear leveling.

11. A storage device comprising:
a communication interface configured to receive storage commands from a host device when the storage device is operationally coupled to the host device;
a mass storage area to store an integral sequence of commands, a first set of internal memory management operations each of which is an extra-sequence operation, and a second set of internal memory management operations each of which is an intra-sequence operation, wherein the integral sequence of commands is in one of an active state and in an inactive state; and
a controller to:
receive, via the communication interface, a command from the host device when the storage device is operationally coupled to the host device;
determine, based on the received command, when the integral sequence of commands is in the active state or is transitioning from the inactive state to the active state; and
responsive to the integral sequence of commands being in the active state or transitioning from the inactive state to the active state, prohibit execution of a first operation of the first set of internal memory management operations and enable execution of a second operation of the second set of internal memory management operations.

12. The storage device according to claim 11, wherein the controller is further adapted to:
determine when the integral sequence of commands is in the inactive state or is transitioning from the active state to the inactive state based on information derived from the received command; and
responsive to the integral sequence of commands being in the inactive state or transitioning from the active state to the inactive state, permit execution of an operation of the first set of internal memory management operations.

13. The storage device according to claim 12, wherein the controller is further adapted to determine a transition or a transitioning of the integral sequence of commands from the inactive state to the active state or from the active state to the inactive state by determining whether the information derived from the received command satisfies one of a predefined beginning-of-sequence condition and a predefined end-of-sequence condition, respectively.

14. The storage device according to claim 11, wherein the integral sequence of commands is associated with playing back multimedia content.

15. The storage device according to claim 11, wherein the integral sequence of commands is associated with capturing multimedia content.

16. The storage device according to claim 11, wherein the integral sequence of commands is associated with a data synchronization command.

17. The storage device according to claim 11, wherein the integral sequence of commands is associated with a boot command.

18. The storage device according to claim 11, wherein the first operation of the first set of internal memory management operations is selected from the group consisting of:
flash memory management operations;
encryption/decryption of outgoing/incoming data;
compression/decompression of outgoing/incoming data;
anti-virus operation;
defragmentation operation;
ruggedization;
backing up data;
changing data format;
garbage collection;
employing an error correction mechanism;
caching data into a fast flash storage area;
flushing cached data;
using low power mode; and
static wear leveling.

19. The storage device according to claim 11, wherein the second operation of the second set of internal memory management operations is selected from the group consisting of:
flash memory management operations;
encryption/decryption of outgoing/incoming data;
compression/decompression of outgoing/incoming data;
anti-virus operation;
defragmentation operation;
ruggedization;
backing up data;
changing data format;
garbage collection;
employing an error correction mechanism;
caching data into a fast flash storage area;
flushing cached data;
using low power mode; and
static wear leveling.

* * * * *

UNITED STATES PATENT AND TRADEMARK OFFICE
CERTIFICATE OF CORRECTION

PATENT NO. : 7,788,415 B2  Page 1 of 1
APPLICATION NO. : 12/127229
DATED : August 31, 2010
INVENTOR(S) : Amir Mosek et al.

It is certified that error appears in the above-identified patent and that said Letters Patent is hereby corrected as shown below:

In the Claims section, Column 22, Claim 3, Line 38, "first set of internal operations and, refraining from" should read --first set of internal operations and refraining from--.

Signed and Sealed this

Twenty-third Day of November, 2010

David J. Kappos
*Director of the United States Patent and Trademark Office*